United States Patent [19]

Orr, Jr. et al.

[11] Patent Number: 4,804,806
[45] Date of Patent: Feb. 14, 1989

[54] WOVEN ELECTRICAL TRANSMISSION CABLE FOR RAPID AIRCRAFT REPAIR AND METHOD

[75] Inventors: Lawrence W. Orr, Jr.; Ray T. Motte, both of Simpsonville, S.C.

[73] Assignee: Woven Electronics Corporation, Greenville, S.C.

[21] Appl. No.: 61,406

[22] Filed: Jun. 15, 1987

[51] Int. Cl.$^4$ .............................................. H01B 7/04
[52] U.S. Cl. ........................... 174/117 M; 139/425 R; 156/148; 174/112
[58] Field of Search ........................... 174/117 M, 112; 156/148; 139/425 R

[56] References Cited

U.S. PATENT DOCUMENTS

| | | | |
|---|---|---|---|
| 3,447,120 | 5/1969 | Rask et al. | 174/117 M |
| 3,476,870 | 11/1969 | Ross | 174/117 M |
| 3,479,565 | 11/1969 | Ross et al. | 139/425 R |
| 3,654,380 | 4/1972 | Tatum et al. | 174/34 X |
| 3,984,622 | 10/1976 | Ross | 174/117 M X |

FOREIGN PATENT DOCUMENTS 647747   2/1979   U.S.S.R. ........................ 174/117 M

*Primary Examiner*—Morris H. Nimmo
*Attorney, Agent, or Firm*—Cort Flint

[57] ABSTRACT

A woven electrical transmission cable and method for the rapid repair of a defective electrical cable in an aircraft and the like is disclosed. A woven electrical transmission cable (A) for rapid repair includes longitudinal warp anchor cords (B) interwoven with warp and weft yarns (38, 40). The warp and weft yarns are woven in a prescribed pattern in which elongated electrical conductors (36) are bound in individual cells (22, 24, 26, 28, 30, 32). A prescribed number of conductors (36) is included in each cell which may be easily traced and identified at opposing ends of the cable within the individual cells. This insures reliable termination at the ends of the cable. In accordance with the method, cable (A) is bonded to the skin (12a) of an aircraft adjacent access openings (14, 16) to repair a defective cable (11a) which has been damaged by a bullet or shell through hole (11). Woven electrical repair cable (A) by-passes defective cable (11a) and may be terminated through the access openings. Longitudinal anchor cords (B) are sufficiently absorbent and have sufficient mass and surface to embed in a matrix material (20) for bonding the cable to the exterior aircraft skin. The weave pattern and cellular construction of woven cable (A) provides an aerodynamic profile so that the aircraft may be operated with the repair cable.

14 Claims, 3 Drawing Sheets

CONDUCTORS OMITTED

CONDUCTORS OMITTED

WOVEN ELECTRICAL TRANSMISSION CABLE FOR RAPID AIRCRAFT REPAIR AND METHOD

BACKGROUND OF THE INVENTION

Sophisticated vehicles such as military vehicles and aircraft have considerable electronic circuitry joined together by electrical cables. The electrical cables are routed inside the vehicle chassis or aircraft fuselage and are fairly inaccessible. Often military aircraft need to be repaired in the field where time consuming and laborious repair of interior electrical cables is not practical or possible. In many instances, engine removal is necessary to repair defective cabling. A common cause of damage is that of bullets piercing the fuselage skin and cable of aircraft resulting in shorting out of cables. The skill required to replace cables inside the fuselage of the aircraft in accordance with original specifications is often not available in many field installations. The rapid repair of electrical cables and assemblies in modern sophisticated aircraft is a problem to which considerable attention need be given.

U.S. Pat. No. 3,654,380 discloses a woven cable having plural conductors twisted together as one and bound side-by-side in a woven harness having a general box-weave pattern. However, this pertains only generally and lacks specific features as disclosed herein to provide a suitable cable or method for the rapid repair of a defective electrical cable.

Accordingly, an object of the invention is to provide an electrical transmission cable and method for rapidly repairing a damaged or defective electrical cable in an aircraft.

Another object of the invention is to provide a woven electrical transmission cable and method for rapidly repairing electrical cables inside an aircraft fuselage and the like wherein access to the interior of the fuselage is not necessary so that a rapid repair may be had without the need of extensive skill and labor.

Still another object of the invention is to provide a woven electrical transmission cable for rapidly repairing an electrical cable in an aircraft and the like wherein conductors in the cable may be broken out in a programmed manner and routed through access openings in the fuselage for rapid repair.

Another object of the invention is to provide a woven electrical transmission cable and method for rapidly repairing a defective electrical cable in an aircraft and the like having longitudinal anchor cords woven into the cable which may be embedded in a matrix to bond the cable to the exterior skin of the aircraft so that repair may be had from the exterior of the aircraft avoiding the time consuming and tedious operation of preparing the electrical cable on the inside of the aircraft. In accordance with the invention, the defective electrical cable inside the aircraft may be by-passed and a repair cable affixed to the outside skin of the aircraft which may be routed through access openings into the aircraft for termination at the terminals of the by-passed cable.

SUMMARY OF THE INVENTION

The above objectives are accomplished by weaving a rapid repair cable consisting of a plurality longitudinal conductors arranged generally side-by-side into conductor cells. Each conductor cell contains a prescribed number of conductors which may be then programmed and broken out to make connections by-passing the defective electrical cable. The conductors grouped into cells may be conveniently traced for break-out. Longitudinal anchor cords having adequate absorbent surface area are woven with the longitudinal electrical conductors and other weft and yarn weaving elements. The polyester anchor cords bond the cable to the aircraft by a suitable resin matrix. The polyester cords are sufficiently absorbent to be embedded within the matrix material for bonding of the cable to the outside skin of the aircraft. This is done adjacent the access openings of the fuselage through which the repair conductors may be terminated to by-pass the damaged cable. The conductors may be traced through the cable and connected at opposing ends. The aircraft may be operated in this manner until it is possible to return the aircraft for further maintenance. At this time, the rapid repair cable may be removed and the damaged electrical cable repaired inside the fuselage to place the aircraft back into standard operating condition.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3 is a perspective view of a woven electrical transmission cable constructed for the rapid repair of an aircraft and the like;

DETAILED DESCRIPTION OF A PREFERRED EMBODIMENT

Figure 1:
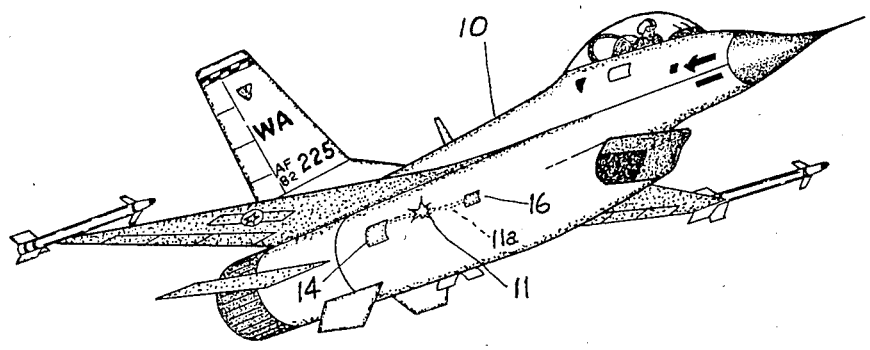
FIG. 1 is a perspective view of an aircraft having a damaged electrical cable repaired in accordance with the cable and method of the present invention.
Figure 2:
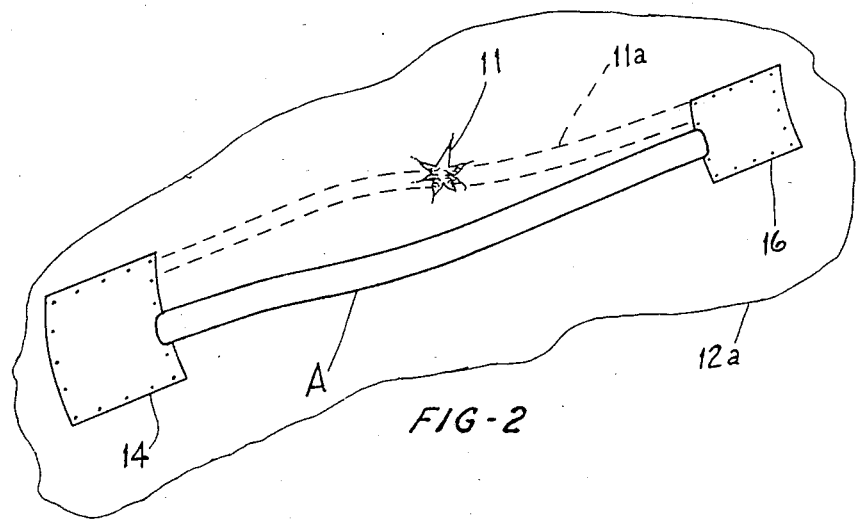
FIG. 2 is a perspective view illustrating by-passing of a damaged cable and repair in accordance with a cable and method of the present invention.

The invention will now be described in more detail in reference to the drawings. FIG. 1 illustrates an aircraft 10 which has been damaged by a bullet or other shell hole at 11. The bullet or shell has pierced an electrical cable 11a inside the aircraft fuselage 12. In accordance with the invention, a woven electrical transmission cable has been bonded to the exterior skin 12a of fuselage 12 for rapid repair of damaged cable 11a. Access openings 14, 16 typically formed at certain locations in the fuselage are used for routing of the exteriorly mounted cable 10 to repair a damaged cable in the fuselage interior. By attaching woven electrical transmission cable A to the skin exterior and routing conductors through access openings 14, 16, there is no need for access to the interior of the fuselage as would require highly skilled and time consuming labor. The conductors of cable A may be routed to the terminal connections for the damaged cable, thus by-passing the cable on the exterior of the aircraft. While the invention is described in reference to a damaged cable, it is to be understood, of course, that rapid repair of a cable inside the aircraft which has become defective for any reason may be had in accordance with the present invention.

Figure 3:
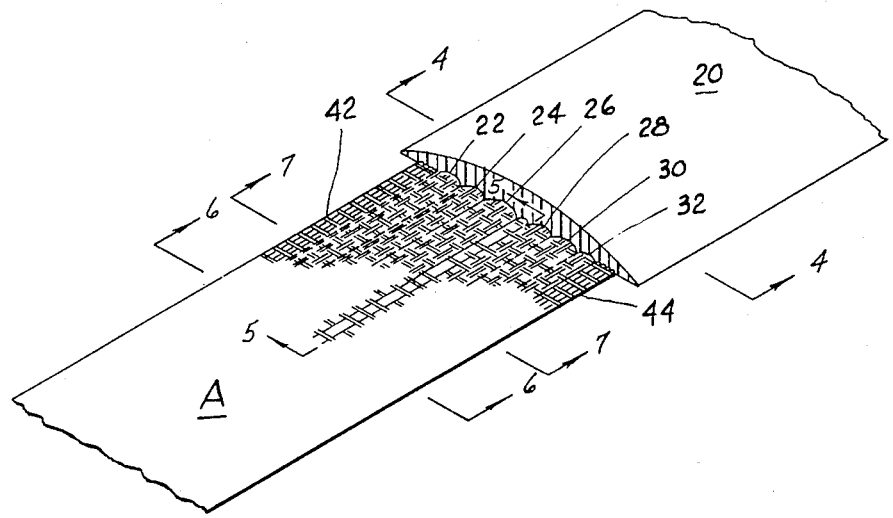
Figure 4:
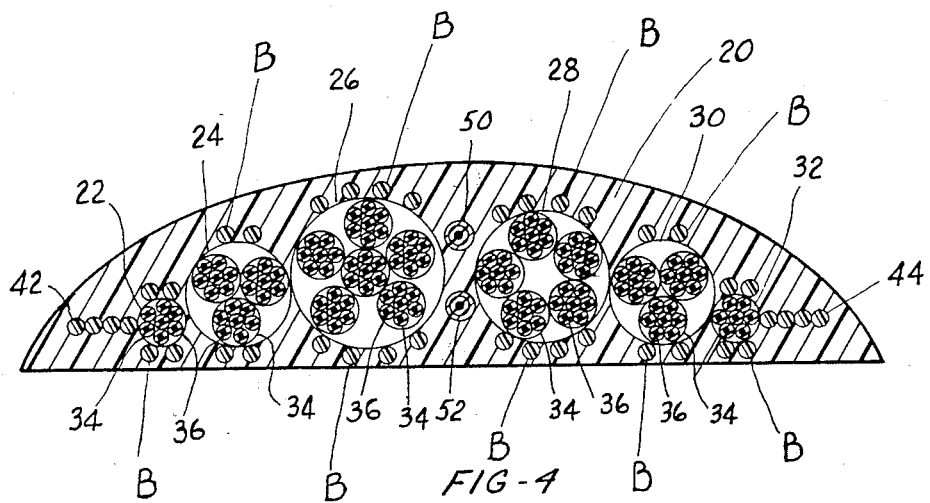
FIG. 4 is a sectional view taken along line 4—4 of FIG. 3.

As can best be seen in FIGS. 3 and 4, woven electrical cable A is affixed to the skin 12a of fuselage 12 by a resinous matrix material 20 which encapsulates the material. To ensure that good chemical bonding and mechanical attachment between fuselage skin 12a and electrical cable A exists, a number of longitudinal, highly absorbent anchor cords B are woven into cable A at selected points of weaving to embed the cable in the matrix material and anchor the cable to the aircraft skin. In one example cords B were utilized in the form of polyester cords having a 0.045 inch diameter for bonding and abrasion resistance. Nylon may also be used. In contrast, warp and weft yarns 38, 40 may be 1000-2 polyester yarns having a diameter of about 0.01 inches.

Referring now in more detail to FIGS. 4-7, the construction of woven electrical repair cable A can best be seen and will now be described. Cable A includes a number of individual conductor cells 22, 24, 26, 28, 30, 32. Each conductor cell includes a plurality of conductors 34. Each conductor 34 is a helix strand which includes seven conductor wires 36 in an insulated, twisted strand having a 7 mil. diameter. Wire 36 may be 26 AW6, 19 strand wires with teflon insulation. As can best be seen in FIG. 4, the weave pattern determined by the cells and number of conductors in each cell, provides an aerodynamic profile facilitating smooth air flow over bonded cable A.

Figure 5:
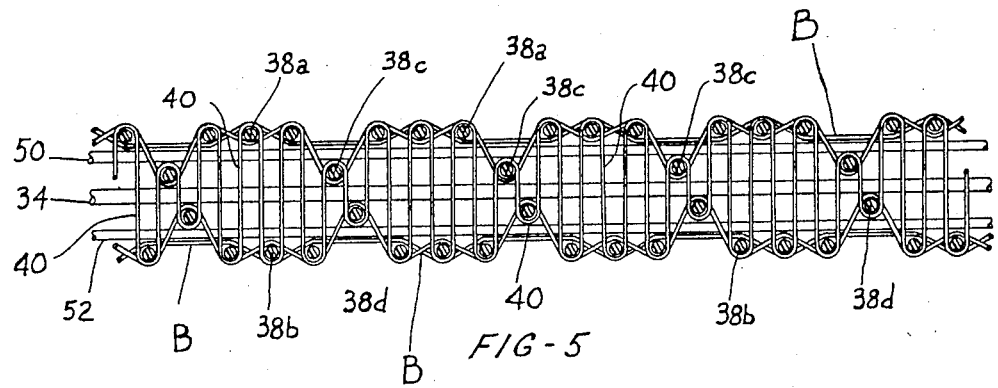
FIG. 5 is a sectional view taken along line 5—5 of FIG. 3.
Figure 6:
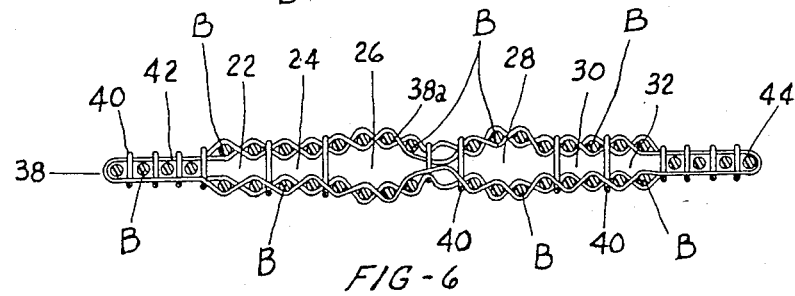
FIG. 6 is a sectional view taken along line 6—6 of FIG. 3.
Figure 7:
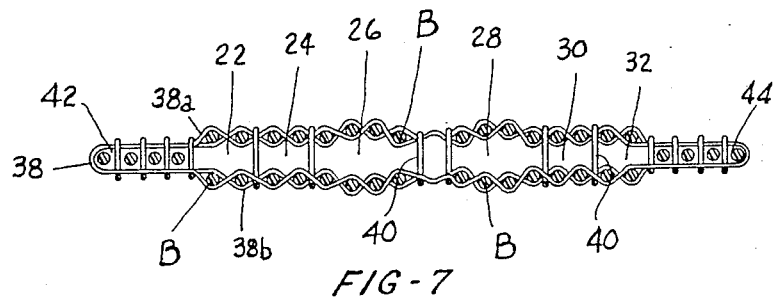
FIG. 7 is a sectional view taken along line 7—7 of FIG. 3.

As can best be seen in FIGS. 5 and 6, the longitudinal conductors 34 are bound in the respective conductor cells by means of a weft yarn 38 woven with a plurality of warp binder yarns 40 in a box weave pattern. Warp yarns 40 are woven between the top run 38a and bottom run 38b and intermediate picks 38c, 38d of weft yarn 38 to bind the conductors in the individual cells. There are about 14 picks per inch in the cable. Longitudinal anchor cords B are woven generally straight through the cable and do not undulate between the top, intermediate, and bottom runs of weft 38, as do the warp binder yarns 40 as can best be seen in FIGS. 5 and 6. At the lateral edges of electrical cable A, there are woven marginal, longitudinal tabs 42, 44 running the length of the cable. A colored visible tracer thread 46, 48 extends longitudinally along each marginal tab to provide a longitudinal cut line. This facilitates cutting of the cable to remove the woven cover and free the conductors for break-out and termination. For example, once tracer 46 is cut, marginal, longitudinal tab 42 may be separated to free conductors 34 in conductor cell 22, warp binders 40 between cell 22, 24 may be removed to remove the conductors in cell 24 and so forth. Two fiber optic lines 50, 52 are woven in the cable for special application.

In accordance with the method, woven cable A is cut from a continuous length of cable to the correct length to run between access panels 14, 16 and to have a freed conductor length sufficient for termination inside the panels. Woven electrical cable A is bonded to the exterior skin of the aircraft. The weave bindings of warps 40 and weft 38 are removed and conductors of sufficient length are freed. Connection of the cable is made and the defective cable is by-passed and removed from electrical connection. By weaving longitudinal cords B into the woven cable, the cable adheres and is bonded well to the aircraft skin so that the aircraft may be operated even at high speeds until permanent repair of the defective cable may be made. By arranging the conductors in cells, as shown, an aerodynamic profile is provided and the conductors may be easily identified at opposing ends of the cable so that conductors are connected to proper terminals at both ends of the cable. Because the individual wires 36 are part of a single conductor 34 this conductor may be traced from one end of the cable to the other inside a particular cell very reliably and conveniently. A suitable bonding resin is Versalock 204, an acrylic structural adhesive manufactured by the Lord Chemical Corp., which makes a good bond between the polyester cords and aircraft skin.

Thus, it can be seen that a highly advantageous construction and method for a rapid repair woven electrical cable can be had in accordance with the present invention for repairing an aircraft or the like vehicle in the field of use so that it does not have to be taken back to base operations until time permits. Time consuming labor and highly trained, skilled technicians are not required for repairing the aircraft in accordance with the present cable and method as may be required for more skilled repair on the inside fuselage of the aircraft.

While a preferred embodiment of the invention has been described using specific terms, such description is for illustrative purposes only, and it is to be understood that changes and variations may be made without departing from the spirit or scope of the following claims.

We claim:

1. A woven electrical transmission cable for the rapid repair of a defective electrical cable inside an aircraft and the like comprising:

a plurality of longitudinal electrical conductors woven in a wrap direction in said cable;

a weft yarn and a plurality of wrap yarns binding said longitudinal electrical conductors in a prescribed weave pattern;

said weave pattern including a number of individual electrical cells with each cell containing a prescribed number of said longitudinal electrical conductors in a manner that said electrical conductors may be readily traced and identified at opposing ends of said cable for accurate termination;

a plurality of longitudinal anchor cords woven in said weave pattern in the warp direction on opposing sides of said cable; and said longitudinal anchor cords having a larger absorption mass and surface than said warp yarns and said weft yarns for being embedded in a resinous matrix material for bonding said woven cable to the exterior fuselage skin of said aircraft.

2. The cable of claim 1 wherein said weave pattern includes a box weave wherein said warp yarns are woven as warp binders between picks of said weft yarn.

3. The cable of claim 1 including woven marginal tabs woven longitudinally along opposing sides of said cable which includes said warp yarns and weft yarns woven together binding a plurality of said cords without any of said electrical conductors.

4. The cable of claim 3 including colored tracer yarns woven longitudinally along the length of said woven marginal tabs along which said cable may be cut for freeing said electrical conductors from said cable.

5. The cable of claim 1 wherein each of said longitudinal electrical conductors consists of a plurality of individual insulated electrical wires twisted with each other.

6. The cable of claim 1 wherein said conductors are woven in said cells in said weave pattern to provide an aerodynamic profile when bonded to said aircraft.

7. The cable of claim 1 wherein the diameter of said anchor cords and warp yarns have a ratio of about 4:1.

8. A method of constructing an electrical transmission cable for the rapid repair of a defective electrical cable in an aircraft and the like comprising:

weaving a plurality of longitudinal electrical conductors extending in a warp direction in said cable with a weft yarn and a plurality of warp yarns in a prescribed weave pattern;

weaving said electrical conductors into individual cells by which said electrical conductors may be readily traced and identified at opposed ends of said cable for accurate termination; and weaving a plurality of longitudinal anchor cords in the warp direction on opposing sides of said cable, said anchor cords having a larger absorption mass and surface than said warp and weft yarns for being embedded in a resinous matrix material for bonding said cable to said aircraft.

9. The method of claim 8 including weaving said cells to include different numbers of said electrical conductors in certain ones of said cells.

10. The method of claim 8 including weaving said warp yarns as warp binders between picks of said weft yarn in a box-weave pattern.

11. The method of claim 8 including weaving marginal tabs on the length of opposing sides of said cable which include said warp yarns and said weft yarns woven with the exclusion of said longitudinal electrical conductors and anchor yarns.

12. The method of claim 10 including weaving colored tracer yarns along the length of said woven marginal tabs along which said marginal tabs may be severed for freeing said conductors from said woven pattern for termination.

13. The method of claim 8 including loosely harnessing said plurality of electrical conductors and each said cell wherein each longitudinal electrical conductor includes a plurality of insulated conductor wires twisted together as a single electrical conductor.

14. the method of claim 8 including weaving said conductors in said cells to provide an aerodynamic cross-section profile facilitating smooth air flow over said cable.

* * * * *